US00RE46657E

(19) United States
(12) Reissued Patent
Berger et al.

(10) Patent Number: US RE46,657 E
(45) Date of Reissued Patent: Jan. 2, 2018

(54) METHOD OF MAKING A TRIHALOSILANE

(71) Applicant: Dow Corning Corporation, Midland, MI (US)

(72) Inventors: Stephanie Berger, Crestwood, KY (US); Dimitris Katsoulis, Midland, MI (US); Robert Thomas Larsen, Midland, MI (US); Matthew J. McLaughlin, Midland, MI (US); Unnikrishnan R. Pillai, Union, KY (US); Jonathan David Wineland, Bedford, KY (US)

(73) Assignee: Dow Corning Corporation, Midland, MI (US)

(21) Appl. No.: 14/711,011

(22) Filed: May 13, 2015

Related U.S. Patent Documents

Reissue of:
(64) Patent No.: 8,697,022
Issued: Apr. 15, 2014
Appl. No.: 13/877,909
PCT Filed: Dec. 13, 2011
PCT No.: PCT/US2011/064544
§ 371 (c)(1),
(2) Date: Apr. 5, 2013
PCT Pub. No.: WO2012/082686
PCT Pub. Date: Jun. 21, 2012

U.S. Applications:
(60) Provisional application No. 61/424,118, filed on Dec. 17, 2010.

(51) Int. Cl.
*C01B 33/08* (2006.01)
*C01B 33/107* (2006.01)

(52) U.S. Cl.
CPC ..... *C01B 33/1071* (2013.01); *C01B 33/107* (2013.01)

(58) Field of Classification Search
CPC ..... C01B 33/1071; C01B 33/107
See application file for complete search history.

(56) References Cited

U.S. PATENT DOCUMENTS

| | | | | |
|---|---|---|---|---|
| 2,403,370 | A | 7/1946 | Hurd | |
| 2,406,605 | A * | 8/1946 | Hurd | 556/474 |
| 2,458,703 | A * | 1/1949 | Hatcher | 423/342 |
| 2,888,476 | A | 5/1959 | Little et al. | |
| 3,057,686 | A | 10/1962 | Muetterties | C01B 33/04 423/347 |
| 4,059,608 | A * | 11/1977 | Calas et al. | 556/468 |
| 4,079,071 | A * | 3/1978 | Neale | 556/468 |
| 4,314,908 | A | 2/1982 | Downing et al. | |
| 4,390,510 | A * | 6/1983 | Ritzer | C01B 33/107 423/342 |
| 4,526,769 | A | 7/1985 | Ingle et al. | |
| 4,836,997 | A | 6/1989 | Lepage et al. | |
| 4,888,435 | A | 12/1989 | Chadwick et al. | |
| 4,946,980 | A | 8/1990 | Halm et al. | |
| 4,973,725 | A | 11/1990 | Lewis et al. | |
| 6,156,380 | A | 12/2000 | Aramata et al. | |
| 6,790,749 | B2 | 9/2004 | Takemura et al. | |
| 6,887,448 | B2 | 5/2005 | Block | |
| 7,212,778 | B2 | 5/2007 | Hisakuni | |
| 7,223,879 | B2 | 5/2007 | Buchwald et al. | |
| 7,442,824 | B2 * | 10/2008 | Paetzold et al. | 556/466 |
| 7,716,590 | B1 | 5/2010 | Nathan | |
| 7,728,176 | B2 | 6/2010 | Masaoka | |
| 2005/0074387 | A1 | 4/2005 | Bulan et al. | |
| 2010/0280295 | A1 | 11/2010 | Armbruester et al. | |
| 2014/0212352 | A1 * | 7/2014 | Onal | C01B 33/107 423/342 |

FOREIGN PATENT DOCUMENTS

| | | | | |
|---|---|---|---|---|
| CA | 2829692 | A1 * | 9/2012 | C01B 33/1071 |
| CA | 2829701 | A1 | 9/2012 | |
| DE | 3024319 | | 1/1982 | |
| DE | 4041644 | A1 | 6/1992 | |
| DE | 19654154 | | 6/1997 | |
| DE | 102011002436 | A1 * | 7/2012 | C01B 33/1071 |
| JP | 51-23226 | | 2/1976 | |
| JP | 2009111202 | | 5/2009 | |
| WO | 2012-123159 | | 9/2012 | |
| WO | WO 2013138461 | A1 * | 9/2013 | C01B 33/10763 |

OTHER PUBLICATIONS

Dallas T. Hurd, The Vapor Phase Alkylation and Hydrogenation of Chlorosilanes, J. Am. Chem. Soc., 1945, 67 (9), pp 1545-1548.
Methivier, et al., Pd/SiC catalysts. Characterization and catalytic activity for the methane total oxidation.. Institut de Recherches sur la Catalyse-CNRS, conventionne a l'Universite Claude Bernard Lyon 1, Villeurbanne, Fr. Journal of Catalysis (1998), 173(2), 374-382.
Dallas T. Hurd, The Vapor Phase Alkylation and Hydrogenation of Chlorosilanes, J. Am. Chem. Soc., 1945, 67 (9), pp. 1545-1548.
Eaborn, C. et al., Further studies on reactions of organic halides with disilanes catalysed by transition metal complexes, Journal of Organometallic Chemistry, vol. 225, 1982, pp. 331-341.
Golubtsov, S.A. et al., Role of the Products of Partial Chlorination of Silicon in the Formation of Methyltrichlorosilane, Russian Chemical Bulletin, vol. 21, No. 3 (1972), pp. 584-586.
H. Walter, Mechanism of the silicide-catalysed hydrodehalogenation of silicon tetrachloride to trichlorosilane, J. Chem. Soc., Faraday Trans., 1996,92, 4605-4608.

(Continued)

*Primary Examiner* — Carlos Lopez
(74) *Attorney, Agent, or Firm* — Catherine U. Brown

(57) ABSTRACT

A method of making a trihalosilane comprising contacting an organotrihalosilane according to the formula RS1X3 (I), wherein R is $C_1$-$C_{10}$ hydrocarbyl and each X independently is halo, with hydrogen, wherein the mole ratio of the organotrihalosilane to hydrogen is from 0.009:1 to 1:2300, in the presence of a catalyst comprising a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, (vii) Mg, and (viii) Rh at from 300 to 800° C. to form a trihalosilane.

20 Claims, No Drawings

(56) References Cited

OTHER PUBLICATIONS

Juszczyk et al., of Pd/SiO2 catalysts during high temperature reduction., Department of Catalysis on Metals, Institute of Physical Chemistry, Polish Academy of Sciences, Warsaw, Pol. Catalysis Letters (2002), 78(1-4), 95-98.

Juszczyk et al., Transformation of Pd/SiO2 into palladium silicide during reduction at 450° and 500° C., Institute of Physical Chemistry, Department of Catalysis on Metals, Polish Academy of Sciences, Warsaw, Pol. Journal of Catalysis (2003), 220(2), 299-308.

Lobusevich, N.P. et al., Reactions During Direct Synthesis of Alkylchlorosilanes., vol. 48, No. 11, 1978, pp. 2534-2541.

Moreno-Manas, Marcial et al., Formation of Carbon-Carbon Bonds under Catalysis by Transition-Metal Nanoparticles, Department of Chemistry, Universitat Autonoma de Barcelona, Barcelona, Spain. Accounts of Chemical Research (2003), 36(8), 638-643.

Beccalli, Egle M., et al., C—C, C—O, C—N Bond Formation on sp2 Carbon by Palladium(II)-Catalyzed Reactions Involving Oxidant Agents., Istituto di Chimica Organica A. Marchesini, Facolta di Farmacia, Universita di Milano, Milan, Italy. Chemical Reviews (Washington, DC, United States) (2007), 107(11), 5318-5365.

Srebowata, A. et al., Hydrodechlorination of 1,2-dichloroethane over differently reduced Pd/SiO2 catalysts., Institute of Physical Chemistry, Polish Academy of Sciences, Warsaw, Pol. Polish Journal of Chemistry (2003), 77(12), 1841-1848.

Tanaka, Miyoko et al., Nanomaterials Laboratory, National Institute for Materials Science, Tsukuba, Sakura, Japan. Journal of Crystal Growth (2002), 237-239(Pt. 1), 254-258.

Vijh, A. K. et al., Discovery of some new stable electrocatalytic materials for the anodic oxidation of hydrazine., Inst. Rech. Hydro-Quebec, Varennes, QC, Can. Journal of Materials Science Letters (1993), 12(2), 113-15.

Vijh, A. K. et al., Electrochemical activity of silicides of some transition metals for the hydrogen evolution reaction in acidic solutions., International Journal of Hydrogen Energy (1990), 15(11), 789-94.

Yin, Lunxiang, et al., Carbon-carbon coupling reactions catalyzed by heterogeneous palladium catalysts., Institute fuer Chemie, Humboldt-Universitaet Berlin, Berlin, Germany. Chemical Reviews (Washington, DC, United States) (2007), 107(1), 133-173.

Terao, Jun et al., Transition metal-catalyzed C—C bond formation reactions using alkyl halides., Department of Applied Chemistry and Center for Atomic and Molecular Technologies, Graduate School of Engineering, Osaka University, 2-1 Yamadaoka, Suita, Osaka, Japan. Bulletin of the Chemical Society of Japan (2006), 79(5), 663-672.

Methivier, et al., Pd/SiC catalysts. Characterization and catalytic activity for the methane total oxidation. Institut de Recherches sur la Catalyse-CNRS, conventionne a l'Universite Claude Bernard Lyon 1, Villeurbanne, Fr. Journal of Catalysis (1998), 173(2), 374-382.

* cited by examiner

METHOD OF MAKING A TRIHALOSILANE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a U.S. national stage filing under 35 U.S.C. §371 of PCT Application No. PCT/US11/064544 filed on 13 Dec. 2011, currently pending, which claims the benefit of U.S. Provisional Patent Application No. 61/424,118 filed 17 Dec. 2010 under 35 U.S.C. §119 (e). PCT Application No. PCT/US11/064544 and U.S. Provisional Patent Application No. 61/424,118 are hereby incorporated by reference.

CROSS-REFERENCE TO RELATED APPLICATIONS

None

FIELD OF THE INVENTION

The present invention relates to a method of making a trihalosilane by contacting an organotrihalosilane with hydrogen in the presence of a catalyst comprising a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, (vii) Mg, and (viii) Rh at from 300 to 800° C. to form a trihalosilane.

BACKGROUND OF THE INVENTION

A number of methods of producing trihalosilanes have been disclosed. For example, the reaction of hydrogen chloride with zero-valent silicon has been described. In addition, trichlorosilane has been produced by passing silicon tetrachloride, hydrogen, and hydrogen chloride over zero-valent silicon at 600° C. Further, trichlorosilane has been produced by passing hydrogen and silicon tetrachloride over silicon particles in a first stage, adding hydrogen chloride to the effluent from the first stage, and then passing the effluent and hydrogen chloride over more silicon particles optionally containing a catalyst (i.e., CuCl) in a second stage. Finally, trichlorosilane has been produced by passing hydrogen, silicon tetrachloride, and hydrogen chloride over zero-valent silicon containing homogeneously distributed copper silicide.

While the art describes methods of producing trichlorosilane, the methods have some limitations. For example, many of these processes employ zero-valent silicon. Since zero-valent silicon is typically produced by the highly energy-intensive carbothermic reduction of silicon dioxide, using it directly adds costs to these processes.

Therefore, there is a need for more economical methods of producing trihalosilanes that avoid the direct use of zero-valent silicon.

BRIEF SUMMARY OF THE INVENTION

The Abstract is incorporated here by reference. The present invention is directed to a method of making a trihalosilane comprising contacting an organotrihalosilane according to the formula $RSiX_3$ (I), wherein R is $C_1$-$C_{10}$ hydrocarbyl and each X independently is halo, with hydrogen, wherein the mole ratio of the organotrihalosilane to hydrogen is from 0.009:1 to 1:2300, in the presence of a catalyst comprising a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, (vii) Mg, and (viii) Rh at from 300 to 800° C. to form a trihalosilane of formula $HSiX_3$, wherein X is as defined above.

Since the method of the invention does not directly employ zero-valent silicon to make trihalosilane, the method may be more economical and require less energy than other methods in the art for producing trihalosilane.

The trihalosilanes produced according to the method of the present invention may be used to make high purity polysilicon, i.e., high purity polycrystalline silicon, which is used in solar cells or electronic chips, or it can be hydrolyzed in known processes to produce polysiloxanes, which find use in many industries and applications

DETAILED DESCRIPTION OF THE INVENTION

The Brief Summary is incorporated here by reference. In some embodiments the method may be a method of making a trihalosilane, the method comprising: contacting an organotrihalosilane according to the formula $RSiX_3$ (I), wherein R is $C_1$-$C_{10}$ hydrocarbyl and each X independently is halo, with hydrogen, wherein the mole ratio of the organotrihalosilane to hydrogen is from 1:3 to 1:2300, in the presence of a catalyst comprising a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, and (vii) Mg at from 300 to 800° C. to form a trihalosilane. The trihalosilane may be of formula $HSiX_3$, wherein X is as defined above. Any and all examples herein are not limiting.

The method may further comprise making a dihalosilane in the contacting step, wherein the dihalosilane is of formula $H_2SiX_2$, wherein X is as defined for the trihalosilane. The method may further comprise making a monohalosilane in the contacting step, wherein the monohalosilane is of formula $H_3SiX$, wherein X is as defined for the trihalosilane. The method may further comprise making a tetrahalosilane as a by-product in the contacting step, wherein the tetrahalosilane is of formula $SiX_4$, wherein X is as defined for the trihalosilane. The contacting step making the trihalosilane, alternatively the trihalosilane and dihalosilane, may further comprise diluting the hydrogen with a diluent gas (i.e., an inert gas, e.g., nitrogen gas) as described later. The method may be characterizable by a combined selectivity for making the trihalosilane and dihalosilane of at least 50 weight percent (sum of wt % for trihalosilane+wt % dihalosilane) based on total weight of all silanes made by the method in the contacting step. Depending upon the particular catalyst, reaction conditions, reactor material, and residence times employed, the made silanes may be the trihalosilane and optionally any one or more of the dihalosilane, a monohalosilane, a tetrahalosilane, a silane of formula $RHSiX_2$, a silane of formula $RH_2SiX$, and a silane of formula $RH_3Si$. Alternatively, the made silanes may comprise the trihalosilane, dihalosilane, and tetrahalosilane; alternatively the trihalosilane and dihalosilane; alternatively the trihalosilane and the monohalosilane; alternatively the trihalosilane. The made silanes may further comprise the silane of formula $RHSiX_2$. In the foregoing total SiH selectivites, R may be methyl (Me) and X may be chloro.

The organotrihalosilane is according to the formula $RSiX_3$ (I), wherein R is $C_1$-$C_{10}$ hydrocarbyl, and each X independently is halo. Each halo, i.e., halogen atom, independently is chloro, bromo, fluoro, or iodo. Each X may be chloro, i.e., chlorine atom.

The hydrocarbyl groups represented by R typically have from 1 to 10 carbon atoms, alternatively from 1 to 6 carbon atoms, alternatively from 1 to 4 carbon atoms, alternatively from 1 to 3 carbon atoms, alternatively 1 carbon atom. Acyclic hydrocarbyl groups containing at least three carbon atoms can have a branched or unbranched structure. Examples of hydrocarbyl groups include alkyl, such as $C_1$-$C_{10}$ alkyl, $C_1$-$C_6$ alkyl, $C_1$-$C_4$ alkyl, $C_1$-$C_3$ alkyl, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; aralkenyl, such as styryl and cinnamyl; and alkynyl, such as ethynyl and proynyl.

Examples of the organotrihalosilane include ($C_1$-$C_{10}$ alkyl)trichlorosilane, ($C_1$-$C_6$ alkyl)trichlorosilane, ($C_1$-$C_4$ alkyl)trichlorosilane, ($C_1$-$C_3$ alkyl)trichlorosilane, methyltrichlorosilane ($CH_3SiCl_3$), methyltribromosilane, methyltrifluorosilane, methyltriiodosilane, ethyltrichlorosilane, ethyltribromosilane, ethyltrifluorosilane, ethyltriiodosilane, propyltrichlorosilane, propyltribromosilane, propyltrifluorosilane, propyltriiodosilane, butyltrichlorosilane, butyltribromosilane, butyltrifluorosilane, butyltriiodosilane, phenyltrichlorosilane, phenyltribromosilane, phenyltrifluorosilane, phenyltriiodosilane, benzyltrichlorosilane, benzyltribromosilane, benzyltrifluorosilane, and benzyltriiodosilane. In one embodiment, the organotrihalosilane is methyltrichlorosilane. The organotrihalosilane may comprise a mixture of at least two different organotrihalosilanes, e.g., a mixture comprising $CH_3SiCl_3$ and $CH_3SiBr_3$, or $CH_3SiCl_3$ and $CH_3CH_2SiCl_3$, or $CH_3SiCl_3$ and $CH_3SiCl_2Br$, or $CH_3SiCl_3$ and $CH_3CH_2SiBr_3$.

Methods of making organotrihalosilanes are known in the art. Many of these compounds are available commercially.

The catalyst comprises a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, (vii) Mg, and (viii) Rh. Alternatively, the catalyst comprises a metal selected from (i) Re, (ii) a mixture comprising Re and at least one element selected from Pd, Ru, Mn, Cu, and Rh, (iii) a mixture comprising Ir and at least one element selected from Pd and Rh, (iv) Mn, (v) a mixture comprising Mn and Rh, (vi) Ag, and (vii) Mg. The catalyst metal may be selected from: (i), (iv), (vi), and (vii); alternatively (ii), (iii), and (v); alternatively (i); alternatively (ii); alternatively (iii); alternatively (iv); alternatively (v); alternatively (vi); alternatively (vii). Alternatively, the catalyst metal may be selected from: (ii), (iii), (v), and (viii); alternatively (ii), (iii), and (viii); alternatively (ii), (v), and (viii); alternatively (iii), (v), and (viii); alternatively (ii) and (viii); alternatively (iii) and (viii); alternatively (v) and (viii); alternatively (viii).

The mixtures in (ii), (iii), and (v) typically comprise from 0.1 to less than 100% (w/w), alternatively from 50 to less than 100% (w/w), alternatively, from 70 to less than 100% (w/w), alternatively, from 80 to 99.9% (w/w), based on the total weight of the mixture, of Re, Ir, or Mn, respectively, with the balance being at least one of the other elements of the mixture described above in (ii), (iii), and (v).

The catalyst may further comprise a support. Examples of supports include oxides of aluminum, titanium, zirconium, and silicon; activated carbon; carbon nanotubes; fullerenes; graphene and other allotropic forms of carbon. In one embodiment, the support is activated carbon. For example, the catalyst may comprise Re on the activated carbon; Re and Pd on the activated carbon; Rh and Re on the activated carbon; Ru and Re on the activated carbon; Mn and Re on the activated carbon; Re and Cu on the activated carbon; Ag on the activated carbon; Mn and Rh on the activated carbon; Mg on the activated carbon; Rh and Ir on the activated carbon; Ir and Pd on the activated carbon; or Rh on the activated carbon. The catalyst may be any one of the immediately foregoing catalysts. Any of the catalysts, e.g., the Rh on activated carbon, may be employed under conditions of reaction temperature and pressure so as to yield $HSiX_3$ (e.g., $HSiCl_3$) in a higher amount (e.g., ≤2× (w/w), alternatively ≥4× (w/w), alternatively ≥10× (w/w),) than an amount of the corresponding $RHSiX_2$ (e.g., $CH_3HSiCl_2$). In some embodiments the catalyst yields $HSiX_3$ without yielding $RHSiX_2$. In the immediately foregoing supported multimetal catalysts (ii), (iii), or (v), each of the at least two metals may be on the activated carbon. Further, the multimetal catalyst may have a higher w/w % of the first listed one of the at least two metals compared to the w/w % of the second listed one of the at least two metals.

When the catalyst comprises a support, the catalyst typically comprises from 0.1 to less than 100% (w/w), alternatively from 0.1 to 50% (w/w), alternatively from 0.1 to 35% (w/w), of the metal or the mixture of metals, based on the combined weight of the support and the metal or mixture.

As used herein, the term "metal" refers to zero-valent metal, a metal compound, or a combination of zero-valent metal and a metal compound. The oxidation number of the metal can vary, for example, from 0 to an oxidation number equal to the metal's group number in the Periodic Table of Elements. In one embodiment, the oxidation number of the metal is 0.

The catalyst can have a variety of physical forms including lumps, granules, flakes, and powder.

Examples of the unsupported catalyst include Re, Re and Pd, Re and Ru, Re and Mn, Re and Cu, Re and Rh, Ir and Pd, Ir and Rh, Mn, Mn and Rh, Ag, Mg, and Rh, wherein each of the metals, except Mg, has an oxidation number of 0 and Mg has an oxidation number of +2. That is, Mg is Mg(II).

Examples of the supported catalyst include the metal(s) of the unsupported catalysts described above on an activated carbon support.

The unsupported and supported catalysts can be made by processes known in the art. For example, to make the unsupported catalyst, the zero-valent metals may be mixed to form the catalyst. For example, zero-valent Re and Pd may be mixed to form the unsupported catalyst. Alternatively, metal salts, including halide, acetate, nitrate, and carboxylate salts may be mixed in desired combinations and proportions and then reduced with hydrogen at elevated temperature, typically around 500° C. One such reduction process is described below for making the supported catalyst.

The supported catalyst may be prepared by dissolving a metal salt, such as rhenium chloride, or at least two soluble salts of different metals such as rhenium chloride and palladium chloride, in a solvent, such as water or acid, applying this metal salt solution to a support, and reducing the salt on the surface of the support. For example, $ReCl_3$ can be dissolved in water or hydrochloric acid and mixed with activated carbon. Excess $ReCl_3$ solution can then be removed, and the activated carbon-$ReCl_3$ mixture dried. The $ReCl_3$ can then be reduced on the activated carbon with hydrogen at high temperature, typically about 500° C., to give the supported rhenium catalyst. The order of addition and reduction and multistep addition of salts and subsequent reduction can also be carried out to prepare the supported catalyst. The supported multimetal catalyst may have each of the at least two metals deposited on the same support, including the same particles of the same support. The at least two metals may be deposited simultaneously or sequentially, with a drying step after each deposition. In addition or alternatively, it is contemplated that the supported multimetal catalysts may be prepared by separately reducing separate metals on separate supports and then mixing the separately supported metals to form the supported multimetal catalyst. A method of making the supported catalyst is also described in detail in the examples section below. Some of these catalysts are also available commercially.

The reactor for the method of the invention can be any reactor suitable for the combining of gases and solids. For example, the reactor configuration can be a packed bed, stirred bed, vibrating bed, moving bed, a fluidized bed, or reactor tube. To facilitate reaction, the reactor should have means to control the temperature of the reaction zone. The reactor may be made of any material suitable for use with the method, including carbon or stainless steel. The reactor has a contact portion and non-contact portion in operative contact with each other. The contact portion comes in contact with at least one of the organotrihalosilane and hydrogen, and optionally the catalyst, during the reaction, whereas the non-contact portion (e.g., an exterior portion) does not. The material of the contact and non-contact portions may be the same or different. Unexpectedly, the material of the contact portion of the reactor may affect the aforementioned selectivity of the method. It has been found that higher iron content leads to lower selectivity. To avoid or reduce any such deleterious reactor material effects on such selectivity, the contact portion of the reactor may lack iron, alternatively may have a low iron content. A low iron content herein means a material having less than 20 weight percent (wt %), alternatively <11 wt %, alternatively ≤10 wt %, alternatively ≤5 wt %, alternatively ≤1 wt %, all based on total weight of the material. For example, the material of the contact portion is other than steel (e.g., carbon steel or stainless steel), as steel has an Fe content of >50 wt % (e.g., stainless steel Fe content is from about 60 to about 70 wt %). Examples of selectivity-preserving reactor materials for the contact portion (and, if desired, for the entire reactor) are quartz glass having low iron content, INCONEL alloy (Special Metals Corporation, Huntington, W. Va. USA), and HASTELLOY alloys (Haynes International, Kokomo, Ind. USA). HASTALLOY alloys are Ni based alloys that comprise Ni and at least some of the following elements: Co (≤3 wt %), Cr (≤1 to 30 wt %), Mo (5.5 to 28.5 wt %), W (0 to 4 wt %), Fe (see below), Si (≤0.08 to 1 wt %), Mn (0 to ≤3 wt %), and C (≤0.01 wt %), total 100 wt %. The HASTALLOY alloy may be any one of the following alloys: B-2 (Fe≤2 wt %), B-3 (Fe≤1.5 wt %, ≥65 wt % Ni; Al≤0.5 wt %, and Ti≤0.2 wt %), C-4 (Fe≤3 wt % and Ti≤0.7 wt %), C-2000 (Fe≤3 wt % and Cu 1.6 wt %), C-22 (Fe 3 wt % and V 0.35 wt %), C-276 (Fe 5 wt % and V 0.35 wt %), N (Fe≤5 wt %, Al 0.5 wt %, Ti 0.5 wt %, and Cu 0.35 wt %), and W (Fe 6 wt % and V 0.6 wt %). INCONEL alloy includes an alloy comprising 72 wt % Ni, 14 to 17 wt % Cr, 6 to 10 wt % Fe, 1 wt % Mn, and 0.5 wt % Cu, and optionally other elements, total is 100 wt %. The contact portion may comprise a lining (e.g., a quartz glass lined stainless steel reactor) inside the non-contact portion. Thus, the contacting may be performed in a reactor having a contact portion in contact with the organosilane and hydrogen, and optionally the catalyst, wherein the contact portion has an iron content of less than 12 weight percent (e.g., less than or equal to 10 wt %, alternatively 0 wt %).

The temperature at which the hydrogen and the organotrihalosilane are contacted in the presence of the catalyst is typically from 300 to 800° C.; alternatively from 400 to 700° C.; alternatively from 500 to 700° C., alternatively from 500 to 600° C., alternatively 700 to 800° C. For example, the catalyst may be the Rh on the activated carbon and the contacting may be at from 700 to 800° C.

The pressure at which the hydrogen and the organotrihalosilane are contacted with the catalyst (reaction pressure) can be sub-atmospheric, atmospheric, or super-atmospheric. For example, the pressure is typically from >0 to 2,900 kilopascals (gauge) (kPag); alternatively from >0 to 1000 kPag; alternatively from >0 to 830 kPag; alternatively from >0 to 500 kPag; alternatively from >0 to 120 kPag. The pressure may be the super-atmospheric pressure, which may be from >120 to 2,900 kPag; alternatively from >120 to 1,100 kPag; alternatively from >120 to 900 kPag; alternatively from >120 to 830 kPag.

The mole ratio of organotrihalosilane to hydrogen contacted in the presence of the catalyst may be from 0.009:1 to 1:2300. Typically the mole ratio has a lower mole ratio value of at least that of any one of the mole ratios listed later in any one of Tables 20 to 23, e.g., at least 0.010:1, alternatively at least 0.10:1, alternatively at least 2.1:1, alternatively at least 4.2:1, alternatively at least 10:1. The mole ratio of organotrihalosilane to hydrogen contacted in the presence of the catalyst is typically from 1:3 to 1:2300, alternatively from 1:10 to 1:2000, alternatively from 1:20 to 1:1000, alternatively from 1:43 to 1:300. Alternatively, the mole ratio of organotrihalosilane to hydrogen may be from 0.009:1 to <1:3, alternatively from 10:1 to <1:3. Alternatively the mole ratio may be a mole ratio of $RSiCl_3/H_2$, alternatively a mole ratio of $MeSiX_3/H_2$, alternatively $MeSiCl_3/H_2$, wherein R and X are as defined previously.

The residence time for the hydrogen and organotrihalosilane is sufficient to form the trihalosilane. For example, a sufficient residence time for the hydrogen and organotrihalosilane is typically at least 0.01 seconds(s); alternatively at least 0.1 s; alternatively from 0.1 s to 10 minutes (min); alternatively from 0.1 s to 1 min; alternatively from 1 s to 10 s. As used herein, "residence time" means the time for one reactor volume of reactant gases (i.e., hydrogen and organotrihalosilane) to pass through a reactor charged with catalyst (i.e., contact time). The desired residence time may be achieved by adjusting the flow rate of the hydrogen and organotrihalosilane.

The hydrogen and organotrihalosilane are typically fed to (into) the reactor simultaneously; however, other methods of combining, such as by separate pulses, are also envisioned. The hydrogen may be diluted with a diluent gas, and the resulting gas mixture may be fed to the reactor. The diluent gas is an inert gas such as nitrogen, argon, or helium gas. The diluent gas may be used in a quantity such that the mole ratio of hydrogen to diluent gas is from 7:2 to 2:7, alternatively from 5:2 to 2:5. Use of the diluent gas may increase selectivity of the method for making $HSiX_3$ or for $HSiX_3$ and $H_2SiX_2$. The organotrihalosilane and hydrogen or hydrogen/diluent gas mixture may be fed to the reactor at same or different flow rates (e.g., measured in sccm). The hydrogen and diluent gas may be fed at same or different flow rates to make the hydrogen/diluent gas mixture (e.g., $H_2/N_2$). For example, the ratio of flow rate of the hydrogen and to flow rate of the diluent gas may be adjusted from 7:1 to 1:7, alternatively from 6:1 to 2:5, alternatively from 5:1 to 3:4. When the diluent gas is employed in the method, advantageously the mole ratio of organotrihalosilane to hydrogen (e.g., mole ratio of $MeSiCl_3/H_2$) may be higher (i.e., the $H_2$ usage may be lowered) and reaction pressure (e.g., reactor pressure) may be higher than the corresponding mole ratio and reactor pressure in the method embodiments that do not employ the diluent gas. The reaction pressure in the method embodiments that do not employ the diluent gas may be from 100 to 200 psig (690 to 1380 kPag), e.g., 150 psig (1040 kPag). The reaction pressure in the method embodiments employing the diluent gas may be from >200 to 500 psig (>1380 kPag to 3450 kPag), alternatively from 225 to 450 psig (1550 kPag to 3100 kPag), alternatively from 250 to 400 psig (1730 kPag to 2800 kPag), alternatively from >200 to 300 psig (>1380 kPag to 2100 kPag). The higher mole ratio of organotrihalosilane to hydrogen advantageously reduces $H_2$ usage. The higher reaction pressure advantageously increases conversion or yield of the trihalosilane, or of the trihalosilane and dihalosilane. Thus, the selectivity for making trihalosilane, alternatively trihalosilane and dihalosilane, of embodiments of the method employing the diluent gas and higher reaction pressure may be higher than the selectivity therefor of the embodiments of the method not employing the diluent gas or higher reaction pressure.

The catalyst is in a catalytic effective amount. As used herein, a "catalytic effective amount" is a sufficient amount of catalyst to form the trihalosilane, described below, when the hydrogen and organotrihalosilane are contacted in the presence of the catalyst. For example, a catalytic effective amount of catalyst is at least 0.01 mg catalyst/$cm^3$ of reactor volume; alternatively at least 0.5 mg catalyst/$cm^3$ of reactor volume; alternatively from 1 to 10,000 mg catalyst/$cm^3$ of reactor volume.

The method of the invention may be conducted as a batch, semi-continuous, continuous, or any other process regime. The method is typically conducted continuously or semi-continuously. As used herein, "continuously" means that a stream of the organotrihalosilane and the hydrogen are constantly fed to the reactor containing the catalyst while the trihalosilane product, unreacted organotrihalosilane and hydrogen, and any byproducts are removed.

The method of the invention is typically conducted until the trihalosilane production rate falls below predetermined limits, at which time the catalyst may be replaced or regenerated. For example, the method is typically conducted until the trihalosilane production rate falls below 95%, alternatively below 85%, alternatively from 10 to 85%, of an initial trihalosilane production rate for the same run. The "initial trihalosilane production rate" is a trihalosilane production rate from an earlier time in the same run and may be different than the first trihalosilane production rate from a particular run.

The method of the invention may also comprise regenerating the catalyst after the contacting the hydrogen and the organotrihalosilane in the presence of the catalyst, e.g., after the catalyst has been contacted with the organotrihalosilane and hydrogen. The catalyst may be regenerated by contacting the catalyst with a hydrochlorination or chlorination agent, such as, for example, HCl or $Cl_2$, or $COCl_2$. The contacting of the catalyst with the hydrochlorination agent is typically at from 100 to 800° C., alternatively from 200 to 600° C., alternatively from 250 to 550° C., and from atmospheric to superatmospheric pressure (reaction pressure), alternatively from 0 to 2000 kPag, alternatively from 5 to 500 pKag. The regeneration may be conducted in a reactor as described and exemplified above. The regeneration is typically conducted until little or no silicon species are produced from the contacting of the hydrochlorination agent with the catalyst.

The method of the invention may also comprise purging prior to the contacting of the hydrogen and organotrihalosilane. As used herein, "purging" means to introduce a gas stream to the reactor containing the catalyst to remove unwanted materials. Unwanted materials are, for example, $O_2$ and $H_2O$. Purging may be accomplished with an inert gas, such as argon, nitrogen, or helium or with a reactive gas, such as silicon tetrachloride, which reacts with moisture thereby removing it, or hydrogen gas.

The method of the invention may also comprise activating the catalyst prior to the contacting of the hydrogen and the organotrihalosilane in the presence of the catalyst. Activation of the catalyst is accomplished by treating the catalyst with hydrogen at elevated temperature, typically around 500° C., for a period of time, typically 1 to 3 hours.

The method may further comprise pre-heating and gasifying the organotrihalosilane by known methods prior to contacting with the hydrogen in the presence of the catalyst. Alternatively, the process may further comprise bubbling the hydrogen through the organotrihalosilane to vaporize the organotrihalosilane prior to contacting with the catalyst.

The process may further comprise recovering the trihalosilane. The trihalosilane may be recovered by, for example, removing gaseous trihalosilane and any other gases from the reactor followed by isolation of the trihalosilane by distillation.

The trihalosilane has the formula $HSiX_3$, wherein X is as defined and exemplified for the organotrihalosilane. Examples of trihalosilanes prepared according to the present process include $HSiCl_3$, $HSiBr_3$, and $HSiI_3$. An additional example is $HSiCl_2Br$.

The method of the present invention produces a trihalosilane from hydrogen and an organotrihalosilane. Since the method does not use zero-valent silicon directly, the method may produce trihalosilane using less energy and more economically than methods that do use zero-valent silicon.

The process of the present invention produces a trihalosilane that can be used to make high purity polysilicon or that can be hydrolyzed in known processes for producing polysiloxanes. High purity polysilicon finds use in, for example, solar cells and computer chips, and polysiloxanes find use in many industries and applications.

EXAMPLES

The following examples are presented to better illustrate the method of the present invention, but are not to be considered as limiting the invention, which is delineated in the appended claims. Unless otherwise noted, all parts and percentages reported in the examples are by weight. The following Table 1 describes the abbreviations used in the examples:

TABLE 1

List of abbreviations used in the examples.

| Abbreviation | Word |
|---|---|
| g | gram |
| mg | milligram |
| Me | methyl |
| wt | weight |
| % | percent |
| mol | mole |
| hr | hour |
| ° C. | degrees Celsius |
| NA | not applicable |
| mL | milliliters |
| cm | centimeter |
| sccm | standard cubic centimeters per minute |
| TCD | thermal conductivity detector |
| Yield (%) | mole %, based on all silicon-containing compounds, of trihalosilane exiting the reactor |
| GC | gas chromatography |
| ND | none detected |
| Temp. | temperature |
| P | pressure |
| psig | pounds per square inch (gauge) (1 psig = 6.9 kPag) |
| kPag | kilopascals (gauge) |
| min | minutes |
| s | seconds |

Method of Producing Catalyst:

A metal chloride was, or two different metal chlorides were, dissolved in water or hydrochloric acid. The activated carbon support was mixed in and pulled under vacuum for 20-30 minutes. The excess liquid was decanted, and the catalyst was dried in an oven at 120-150° C.

About 0.5 g of the oven-dried catalyst was loaded into an open-ended glass tube, held in place with quartz wool on both sides. The tube was connected to the flow reactor. The catalyst was contacted in a Lindberg/Blue Minimite 1 inch tube furnace with 30-40 sccm $H_2$ at 500° C. for 2 hours or 5-10 sccm $H_2$ at 450° C. for about 15 hours. The $H_2$ was ultra high purity from Airgas. The flow of hydrogen was controlled with an MKS 1179A mass flow controller. The total time that $H_2$ and $RSiCl_3$ were flowed at temperature over the catalyst are recorded later in Tables for the Examples.

Reaction Apparatus. The reaction apparatus for Examples 1 to 17 and 24 consisted of an open-ended quartz glass tube with quartz wool to hold the catalyst in place. The tube had a contact portion and was connected to a flow reactor comprising a Lindberg/Blue Minimite 1" tube furnace and an MKS 1179A mass flow controller to control gas flow. In elevated pressure runs, the glass tube was inserted into a steel tube with an inner diameter just big enough to fit the glass tube. An o-ring was fitted over the glass tube at the inlet to prevent flow of gases around the outside. A back-pressure regulator (0-500 psi) from GO Regulators was attached to the reactor at the outlet of the tube furnace. The contact portion in the reaction apparatus for Examples 18-23 and 25 was made from quartz glass, stainless steel, or INCONEL alloy, as the case may be described later.

Reagents. The hydrogen was ultra high purity hydrogen from Airgas (Radnor, Pa.). The activated carbon and metal salts were purchased from Sigma Aldrich (Milwaukee, Wis.)

Product Analysis. The effluent of the reactor containing the products and byproducts was passed through an actuated 6-way valve (Vici) with constant 100 μL injection loop before being discarded. Samples were taken from the reaction stream by actuating the injection valve and the 100 μL sample passed directly into the injection port of a 6890A Agilent GC for analysis with a split ratio at the injection port of 5:1. The GC contained a single 30 m Rtx-DCA column (Restek, 320 μm inner diameter, 1 μm thick film), which was split at the outlet. One path went to a TCD for quantization of the reaction products and the other path went to a Flame Ionization Detector.

Flow Rates. Methyltrichlorosilane flow rate ratios were determined using known thermodynamic principles governing the operation of a bubbler containing a vaporizable liquid and the flow rate of hydrogen at standard temperature and pressure.

Example 1

Re on carbon. In a flow reactor, about 0.6 g of catalyst, comprising 5.9% (w/w) Re on carbon, were loaded into a glass tube. Activation of the catalyst was performed with 10 sccm $H_2$ at 450° C. for about 15 hours. The temperature of the reactor was decreased to 200° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions and yield listed in Table 2 below.

TABLE 2

$HSiCl_3$ production with Re on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 155 | 10 | 2.1 | 28.3 | 2.4 |
| 500 | 300 | 10 | 1.1 | 14.0 | 4.1 |
| 500 | 342 | 10 | 0.5 | 0.2 | 6.0 |
| 500 | 390 | 10 | 0.2 | −15.2 | 9.7 |
| 500 | 429 | 30 | 0.5 | −14.7 | 5.6 |

Example 2

Re and Pd on carbon. About 0.5 grams of catalyst, comprising 7.5% (w/w) Re and 0.2% (w/w) Pd both on carbon, were loaded into a flow reactor. The catalyst was treated with 20 sccm $H_2$ flow at 500° C. for about 3 hours. After catalyst treatment, the temperature of the reactor was decreased to 300° C., and $H_2$ and methyltrichlorosilane were introduced into the reactor tube by first passing the $H_2$ through a bubbler containing methyltrichlorosilane and then into the reactor tube. The reaction temperature, pressure, flow rates, and flow ratios were varied to determine their affect on trihalosilane yield. Samples were periodically taken from the product stream and analyzed by GC. The analysis results and conditions are listed in Table 3.

TABLE 3

$HSiCl_3$ production with Re—Pd on carbon.

| Temp. (° C.) | Time (min) | $H_2$ (sccm) | $CH_3SiCl_3$ (sccm) | P (psig) | Bubbler Temp (° C.) | $HSiCl_3$ Yield (%) |
|---|---|---|---|---|---|---|
| 500 | 108 | 10 | 0.8 | 1.1 | 0.6 | 11.4 |
| 600 | 146 | 10 | 0.8 | 1.1 | 1.5 | 16.5 |
| 700 | 187 | 10 | 0.8 | 1 | 0.4 | 23.8 |
| 700 | 224 | 10 | 0.3 | 1 | −15.4 | 34.2 |
| 700 | 270 | 20 | 0.2 | 1.1 | −31.4 | 42.0 |

TABLE 3-continued $HSiCl_3$ production with Re—Pd on carbon.

| Temp. (° C.) | Time (min) | $H_2$ (sccm) | $CH_3SiCl_3$ (sccm) | P (psig) | Bubbler Temp (° C.) | $HSiCl_3$ Yield (%) |
|---|---|---|---|---|---|---|
| 700 | 305 | 10 | 0.1 | 36.5 | −14.2 | 54.5 |
| 700 | 348 | 30 | 0.01 | 70.5 | −53.4 | 58.4 |
| 700 | 385 | 20 | 0.04 | 70 | −33 | 68.4 |
| 800 | 420 | 20 | 0.07 | 76.5 | −23.1 | 53.8 |

Example 3

Re and Pd on carbon. In a flow reactor, about 0.5 g of catalyst, comprising 8.1% (w/w) Re and 1.0% (w/w) Pd both on carbon, were loaded into a glass tube. Activation of the catalyst was performed with 10 sccm $H_2$ at 450° C. for about 15 hours. The temperature of the reactor was decreased to 400° C. and the reaction was started by passing $H_2$ through a $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 4 below.

TABLE 4

$HSiCl_3$ production with Re and Pd on carbon supported catalyst.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 47 | 10 | 2.1 | 26.1 | 6.5 |
| 600 | 86 | 10 | 2.2 | 27.0 | 8.6 |
| 700 | 121 | 10 | 2.3 | 27.6 | 17.3 |
| 700 | 164 | 10 | 0.9 | 8.0 | 22.2 |
| 700 | 204 | 10 | 0.3 | −15.0 | 43.5 |
| 700 | 238 | 2 | 0.06 | −15.8 | 42.8 |
| 700 | 287 | 20 | 0.4 | −15.4 | 47.2 |
| 600 | 337 | 10 | 0.2 | −14.8 | 22.1 |

Example 4

Pd and Re on carbon. In a flow reactor, about 0.4 g of catalyst, comprising 15.4% (w/w) Pd and 5.2% (w/w) Re both on carbon, were loaded into a glass tube. Activation of the catalyst was performed with 10 sccm $H_2$ at 450° C. for about 15 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 5 below.

TABLE 5

$HSiCl_3$ production with Pd and Re on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 46 | 10 | 1.7 | 25.8 | 2.9 |
| 700 | 82 | 10 | 1.7 | 26.5 | 11.7 |
| 700 | 132 | 10 | 1.0 | 15.7 | 13.9 |
| 700 | 166 | 10 | 0.5 | −0.1 | 28.3 |
| 700 | 206 | 10 | 0.2 | −15.2 | 26.8 |
| 500 | 240 | 10 | 0.2 | −15.8 | 6.1 |
| 500 | 275 | 20 | 0.3 | −14.7 | 4.1 |
| 200 | 289 | 10 | 1.9 | 28.9 | 0.0 |
| 500 | 397 | 3 | 0.5 | 20.1 | 2.4 |
| 500 | 461 | 3 | 0.09 | −14.5 | 5.8 |
| 700 | 500 | 3 | 0.09 | −14.4 | 21.6 |
| 700 | 544 | 20 | 0.4 | −14.2 | 14.3 |

Example 5

Rh and Re on carbon. In a flow reactor, about 0.5 g of catalyst, comprising 5.0% (w/w) Rh and 1.7% (w/w) Re both on carbon, were loaded into a glass tube. Activation of the catalyst was performed with 30 sccm $H_2$ at 500° C. for 2 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, $MeSiCl_3$ bubbler temperature, and pressure. $HSiCl_3$ was produced at the conditions listed in Table 6 below.

TABLE 6

$HSiCl_3$ production with Rh and Re on carbon.

| Temp. (° C.) | Time (min) | H2 (sccm) | $CH_3SiCl_3$ (sccm) | P (psig) | Bubbler Temp (° C.) | $HSiCl_3$ Yield (%) |
|---|---|---|---|---|---|---|
| 500 | 98 | 10 | 0.7 | 1.3 | −0.4 | 10.0 |
| 600 | 132 | 10 | 0.6 | 1.3 | −3.3 | 23.7 |
| 700 | 165 | 10 | 0.6 | 1.3 | −3.8 | 24.4 |
| 700 | 207 | 10 | 0.2 | 1.3 | −20.5 | 35.6 |
| 700 | 241 | 20 | 0.2 | 22.5 | −21.3 | 49.7 |
| 700 | 282 | 20 | 0.06 | 69 | −26.8 | 49.2 |
| 500 | 314 | 20 | 0.1 | 74.1 | −16.4 | 59.9 |
| 400 | 353 | 10 | 0.2 | 26.8 | −8 | 10.1 |
| 500 | 398 | 10 | 0.2 | 73.3 | 8.7 | 28.4 |
| 500 | 451 | 10 | 0.08 | 77.9 | −7.7 | 50.0 |
| 500 | 490 | 10 | 0.03 | 77.6 | −22.6 | 56.0 |
| 500 | 535 | 10 | 0.01 | 73.6 | −41.0 | 61.7 |
| 500 | 574 | 10 | 0.004 | 74.4 | −52.7 | 63.9 |
| 500 | 614 | 5 | 0.002 | 70.9 | −52.7 | 67.4 |
| 500 | 655 | 20 | 0.01 | 78.3 | −49.9 | 63.5 |
| 500 | 692 | 30 | 0.03 | 72.9 | −43.7 | 55.6 |
| 450 | 730 | 20 | 0.04 | 70 | −31.2 | 52.5 |
| 400 | 768 | 20 | 0.05 | 71.5 | −29.2 | 26.9 |
| 300 | 803 | 20 | 0.05 | 70.6 | −30.6 | 5.1 |

Example 6

Rh and Re on carbon. In a flow reactor, about 0.5 g of catalyst, comprising 4.7% (w/w) Rh and 4.7% (w/w) Re both on carbon, were loaded into a glass tube. Activation of the catalyst was performed with 40 sccm $H_2$ at 500° C. for 2 hours. The temperature of the reactor was increased to 550° C. and the reaction was started by passing $H_2$ through the $MeSiCl_3$ bubbler. Samples were taken from the reaction stream and injected into a GC for analysis using an online switching valve. The reaction was run at near constant conditions. $HSiCl_3$ was produced at the conditions listed in Table 7 below.

TABLE 7

$HSiCl_3$ production with Rh and Re on carbon

| Temp. (° C.) | Time (min) | H2 (sccm) | $CH_3SiCl_3$ (sccm) | P (psig) | Bubbler Temp (° C.) | HSiCl3 Yield (%) |
|---|---|---|---|---|---|---|
| 550 | 14 | 30 | 0.03 | 86.3 | −38.1 | 3.5 |
| 550 | 53 | 30 | 0.04 | 88.4 | −36.6 | 23.3 |
| 550 | 90 | 30 | 0.06 | 88.7 | −30.1 | 40.7 |
| 550 | 127 | 30 | 0.08 | 93 | −24.3 | 48.5 |
| 550 | 175 | 30 | 0.05 | 95.3 | −32.8 | 54.5 |
| 550 | 220 | 30 | 0.06 | 85.9 | −31.2 | 58.8 |
| 550 | 237 | 30 | 0.03 | 80.4 | −41.3 | 63.6 |
| 550 | 273 | 30 | 0.04 | 88.1 | −35.9 | 70.8 |
| 550 | 311 | 30 | 0.04 | 89.7 | −34.7 | 68.9 |
| 550 | 351 | 30 | 0.05 | 89.6 | −33 | 65.7 |
| 550 | 385 | 30 | 0.05 | 88.3 | −32.8 | 65.7 |
| 550 | 428 | 30 | 0.03 | 88.9 | −37.9 | 65.1 |
| 550 | 464 | 30 | 0.04 | 88.5 | −37.2 | 64.6 |
| 550 | 515 | 30 | 0.02 | 123.7 | −39.5 | 64.3 |
| 550 | 555 | 30 | 0.05 | 123.6 | −29.2 | 64.4 |
| 550 | 602 | 30 | 0.2 | 88 | −4.8 | 63.2 |
| 550 | 645 | 30 | 0.2 | 1.6 | −40.3 | 13.8 |

Example 7

Ru and Re on carbon. In a flow reactor, about 0.5 g of catalyst, comprising 5.1% (w/w) Ru and 5.1% (w/w) Re both on carbon, were loaded into a glass tube. Activation of the catalyst was performed with 10 sccm $H_2$ at 450° C. for about 15 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature and $MeSiCl_3$ bubbler temperature. The catalyst activation and reaction were done without applying back pressure to the system. $HSiCl_3$ was produced at the conditions listed in Table 8 below.

TABLE 8

$HSiCl_3$ production with Ru and Re on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 83 | 5 | 0.8 | 26.9 | 4.5 |
| 600 | 119 | 5 | 0.5 | 27.4 | 17.8 |
| 700 | 155 | 5 | 0.6 | 28.1 | 17.7 |
| 700 | 193 | 5 | 0.3 | 15.7 | 22.0 |
| 700 | 233 | 5 | 0.1 | 0.6 | 31.1 |
| 700 | 269 | 5 | 0.07 | −14.4 | 36.1 |
| 600 | 305 | 5 | 0.07 | −14.6 | 46.1 |
| 500 | 358 | 5 | 0.07 | −14.3 | 21.9 |
| 600 | 492 | 5 | 0.1 | −2.6 | 25.4 |

Example 8

Mn and Re on carbon. In a flow reactor, about 0.5 g of catalyst, comprising 2.7% (w/w) Mn and 2.6% (w/w) Re both on carbon, were loaded into a glass tube. Activation of the catalyst was performed with 10 sccm $H_2$ at 450° C. for about 15 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 9 below.

TABLE 9

$HSiCl_3$ production with Mn and Re on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 47 | 10 | 2.3 | 23.0 | 1.4 |
| 700 | 83 | 10 | 2.2 | 23.4 | 12.0 |
| 700 | 132 | 10 | 0.9 | 5.4 | 15.6 |
| 700 | 214 | 10 | 0.3 | −13.7 | 24.9 |
| 500 | 272 | 10 | 0.4 | −10.4 | 0.7 |
| 700 | 329 | 20 | 0.6 | −15.2 | 16.3 |
| 700 | 374 | 3 | 0.1 | −13.8 | 36.1 |

Example 9

Re and Cu on carbon. In a flow reactor, about 0.5 g of catalyst, comprising 6.5% (w/w) Re and 0.9% (w/w) Cu both on carbon, were loaded into a glass tube. Activation of the catalyst was performed with 30 sccm $H_2$ at 500° C. for 3 hours. The temperature of the reactor was decreased to 400° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, pressure, and $MeSiCl_3$ bubbler temperature. $HSiCl_3$ was produced at the conditions listed in Table 10 below.

TABLE 10

$HSiCl_3$ production with Re and Cu on carbon.

| Temp. (° C.) | Time (min) | $H_2$ (sccm) | $CH_3SiCl_3$ (sccm) | P (psig) | Bubbler Temp (° C.) | $HSiCl_3$ Yield (%) |
|---|---|---|---|---|---|---|
| 500 | 60 | 10 | 0.7 | 1.1 | −1.8 | 10.6 |
| 600 | 95 | 10 | 0.8 | 1.1 | 1.6 | 15.3 |
| 700 | 137 | 10 | 0.7 | 1.1 | −0.3 | 17.7 |
| 700 | 178 | 10 | 0.3 | 1.1 | −13.8 | 28.2 |
| 700 | 215 | 10 | 0.1 | 40.8 | −8.1 | 37.3 |

Example 10

Re on carbon. In a flow reactor, about 0.5 g of catalyst, comprising 7.1% (w/w) Re on carbon, were loaded into a glass tube. Activation of the catalyst was performed with 20 sccm $H_2$ at 500° C. for 3 hours. The temperature of the reactor was decreased to 400° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, $MeSiCl_3$ bubbler temperature, and flow rate of $H_2$. The catalyst activation and reaction were done without applying back pressure to the system. $HSiCl_3$ was produced at the conditions listed in Table 11 below.

TABLE 11

$HSiCl_3$ production with Re on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 53 | 10 | 2.1 | 22.1 | 4.5 |
| 600 | 96 | 10 | 1.9 | 19.6 | 12.2 |
| 600 | 132 | 10 | 1.9 | 19.5 | 6.8 |
| 700 | 168 | 10 | 2.0 | 20.6 | 15.2 |
| 700 | 211 | 10 | 1.2 | 10.6 | 16.6 |
| 700 | 275 | 10 | 0.6 | −1.5 | 22.5 |
| 700 | 336 | 10 | 0.3 | −14.9 | 35.9 |
| 700 | 481 | 5 | 0.2 | −13.6 | 35.9 |

Example 11

Ag on carbon. In a flow reactor, about 0.5 g of catalyst, comprising 15.7% (w/w) Ag on carbon, were loaded into a glass tube. Activation of the catalyst was performed with 50 sccm $H_2$ at 450° C. for about 2.5 hours. The temperature of the reactor was decreased to 400° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 12 below.

TABLE 12

$HSiCl_3$ production with Ag on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 47 | 10 | 2.6 | 26.3 | 0.1 |
| 600 | 82 | 10 | 2.6 | 27.0 | 2.3 |
| 700 | 118 | 10 | 2.8 | 27.9 | 10.3 |
| 700 | 161 | 10 | 0.9 | 5.5 | 13.8 |
| 700 | 208 | 10 | 0.3 | −15.6 | 21.8 |
| 700 | 244 | 2 | 0.06 | −14.8 | 34.4 |

Example 12

Mn and Rh on carbon. In a flow reactor, about 0.4 g of catalyst, comprising 3.5% (w/w) Mn and 2.5% (w/w) Rh both on carbon, were loaded into a glass tube. Activation of the catalyst was performed with 10 sccm $H_2$ at 450° C. for about 15 hours. The temperature of the reactor was decreased to 400° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 13 below.

TABLE 13

$HSiCl_3$ production with Mn and Rh on carbon.

| Temp. (° C.) | Time (min) | $H_2$ (sccm) | $CH_3SiCl_3$ (sccm) | Bubbler Temp (° C.) | $HSiCl_3$ Yield (%) |
|---|---|---|---|---|---|
| 500 | 54 | 10 | 2.5 | 26.5 | 1.3 |
| 600 | 90 | 10 | 2.6 | 27.1 | 3.6 |
| 700 | 125 | 10 | 2.7 | 27.8 | 9.5 |
| 700 | 175 | 10 | 1.0 | 7.3 | 12.7 |
| 700 | 220 | 10 | 0.3 | −15.6 | 25.1 |
| 700 | 269 | 20 | 0.5 | −16.6 | 21.9 |
| 700 | 319 | 2 | 0.06 | −13.7 | 37.4 |
| 600 | 363 | 10 | 0.4 | −10.5 | 6.4 |

Example 13

Mg on carbon. In a flow reactor, about 0.5 g of catalyst, comprising 4.1% (w/w) Mg(II) on carbon (loaded as an aqueous solution of $MgCl_2$, were loaded into a glass tube. Activation of the catalyst was performed with 20 sccm $H_2$ at 500° C. for 2.5 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, $MeSiCl_3$ bubbler temperature, and pressure. $HSiCl_3$ was produced at the conditions listed in Table 14 below.

TABLE 14

$HSiCl_3$ production with Mg(II) on carbon.

| Temp. (° C.) | Time (min) | $H_2$ (sccm) | $CH_3SiCl_3$ (sccm) | P (psig) | Bubbler Temp (° C.) | $HSiCl_3$ Yield (%) |
|---|---|---|---|---|---|---|
| 600 | 136 | 10 | 0.7 | 1.3 | 0.0 | 1.0 |
| 700 | 172 | 10 | 0.7 | 1.3 | −0.2 | 20.0 |
| 700 | 208 | 10 | 0.3 | 1.3 | −17.3 | 27.8 |
| 700 | 251 | 20 | 0.3 | 21.8 | −14.9 | 38.9 |
| 700 | 291 | 20 | 0.05 | 47.7 | −35.2 | 53.1 |
| 500 | 327 | 20 | 0.09 | 57.2 | −21.9 | 1.4 |

Example 14

Rh and Ir on carbon. In a flow reactor, about 0.4 g of catalyst, comprising 3.3% (w/w) Rh and 2.7% (w/w) Ir both on carbon, were loaded into a glass tube. Activation of the catalyst was performed with 10 sccm $H_2$ at 450° C. for about 15 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, and $MeSiCl_3$ bubbler temperature. The catalyst activation and reaction were done without applying back pressure to the system. $HSiCl_3$ was produced at the conditions listed in Table 15 below.

TABLE 15

$HSiCl_3$ production with Rh and Ir on carbon.

| Temp. (° C.) | Time (min) | $H_2$ (sccm) | $MeSiCl_3$ (sccm) | Bubbler Temp (° C.) | H2SiCl2 % Yield | $HSiCl_3$ Yield (%) |
|---|---|---|---|---|---|---|
| 500 | 53 | 10 | 2.6 | 26.3 | 0.0 | 1.2 |
| 600 | 90 | 10 | 2.7 | 27.1 | 0.2 | 2.5 |
| 700 | 124 | 10 | 2.8 | 27.9 | 0.7 | 9.1 |
| 700 | 201 | 10 | 1.5 | 15.1 | 0.8 | 8.5 |
| 700 | 260 | 10 | 0.7 | 0.5 | 1.2 | 10.9 |
| 700 | 311 | 10 | 0.3 | −14.7 | 2.1 | 17.7 |
| 700 | 368 | 2 | 0.06 | −15.5 | 2.1 | 32.0 |

Example 15

Ir and Pd on carbon. In a flow reactor, about 0.5 g of catalyst, comprising 4.1% (w/w) Ir and 1.5% (w/w) Pd both on carbon, were loaded into a glass tube. Activation of the catalyst was performed with 20 sccm $H_2$ at 500° C. for 3 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, pressure, and $MeSiCl_3$ bubbler temperature. $HSiCl_3$ was produced at the conditions listed in Table 16 below.

TABLE 16

$HSiCl_3$ production with Ir and Pd on carbon.

| Temp. (° C.) | Time (min) | $H_2$ (sccm) | $MeSiCl_3$ (sccm) | P (psig) | Bubbler Temp (° C.) | $HSiCl_3$ Yield (%) |
|---|---|---|---|---|---|---|
| 500 | 64 | 10 | 2.4 | 1.1 | 23.0 | 1.2 |
| 600 | 98 | 10 | 1.6 | 1.1 | 14.9 | 4.0 |
| 700 | 136 | 10 | 1.7 | 1.1 | 16.2 | 14.8 |
| 700 | 178 | 10 | 0.8 | 1.1 | 0.8 | 17.6 |
| 700 | 112 | 10 | 0.4 | 1.1 | −12.9 | 23.0 |
| 700 | 262 | 10 | 0.3 | 1.1 | −16.3 | 21.9 |
| 700 | 296 | 10 | 0.2 | 20.7 | −12.3 | 43.0 |
| 700 | 331 | 10 | 0.1 | 52.3 | −8.2 | 35.1 |
| 500 | 368 | 10 | 0.09 | 50.2 | −13 | 7.3 |

Example 16

Rh and Re on carbon. In a flow reactor, about 0.4 g of catalyst, comprising 4.7% (w/w) Rh and 4.7% (w/w) Re both on carbon, were loaded into a glass tube. Activation of the catalyst was performed with 50 sccm $H_2$ at 500° C. for 2 hours. The reaction was started by passing $H_2$ through the propyltrichlorosilane bubbler. Samples were taken from the reaction stream and injected into a GC for analysis using an online switching valve. The reaction was run while varying the following conditions: reaction temperature, flow rate of hydrogen, pressure, and $PrSiCl_3$ bubbler temperature. $HSiCl_3$ was produced at the conditions listed in Table 17 below.

TABLE 17

$HSiCl_3$ production with Rh and Re on carbon.

| Temp. (° C.) | Time (min) | $H_2$ (sccm) | $PrSiCl_3$ (sccm)[+] | P (psig) | Bubbler Temp (° C.) | $HSiCl_3$ Yield (%) |
|---|---|---|---|---|---|---|
| 500 | 24 | 30 | 9.0 | 3.0 | 22.2 | 17.0 |
| 550 | 58 | 30 | 3.2 | 28.3 | 22.4 | 42.6 |
| 550 | 91 | 30 | 2.0 | 50.0 | 22.4 | 54.2 |
| 550 | 125 | 30 | 1.2 | 89.7 | 22.6 | 63.3 |
| 550 | 162 | 30 | 0.5 | 94.2 | 3.2 | 66.0 |
| 550 | 200 | 60 | 1.3 | 100.2 | 10.5 | 66.6 |
| 550 | 245 | 60 | 1.4 | 124.3 | 15.6 | 70.1 |
| 550 | 281 | 100 | 2.7 | 114.4 | 17.6 | 71.0 |
| 650 | 319 | 100 | 2.7 | 121.2 | 19.2 | 73.4 |
| 450 | 354 | 100 | 2.8 | 123.7 | 20.3 | 56.6 |
| 500 | 375 | 30 | 4.9 | 13.0 | 21.0 | 25.1 |
| 500 | 453 | 30 | 2.2 | 42.4 | 21.6 | 46.8 |
| 500 | 497 | 30 | 1.1 | 101.8 | 22.2 | 73.6 |
| 500 | 606 | 15 | 0.5 | 112.3 | 22.3 | 82.0 |
| 300 | 651 | 30 | 1.0 | 114.4 | 22.6 | 14.1 |
| 350 | 709 | 30 | 1.0 | 114.0 | 22.8 | 31.9 |
| 400 | 743 | 30 | 1.0 | 114.2 | 23.0 | 56.2 |
| 450 | 778 | 30 | 1.0 | 114.0 | 22.9 | 76.3 |
| 550 | 825 | 15 | 0.5 | 116.7 | 22.9 | 78.6 |

[+]Estimated based on silicon tetrachloride vapor properties.

Example 17

Rh and Re on carbon ($EtSiCl_3$). In a flow reactor, loaded about 0.45 g of catalyst, comprising 3.6% (w/w) Rh and 3.7% (w/w) Re both on carbon, into a glass tube. Performed activation of the catalyst with 50 sccm $H_2$ at 600° C. for 3 hours. Started the reaction by passing $H_2$ through the ethyltrichlorosilane bubbler. Took samples from the reaction stream and injected them using an online switching valve into a GC for analysis. Ran the reaction while varying the following conditions: reaction temperature, flow rate of hydrogen, pressure, and $EtSiCl_3$ bubbler temperature. $HSiCl_3$ was produced at the conditions listed in Table 18 below.

TABLE 18

$HSiCl_3$ production with Rh and Re on carbon.

| Temp. (° C.) | Time (min) | $H_2$ (sccm) | $EtSiCl_3$ (sccm) | P (psig) | Bubbler Temp (° C.) | $HSiCl_3$ Yield (%) |
|---|---|---|---|---|---|---|
| 700 | 29 | 60 | 3.2 | 2 | 23 | 26 |
| 600 | 45 | 60 | 3.2 | 2 | 23 | 2.4 |
| 500 | 402 | 30 | 0.2 | 112 | 23 | 7.4 |
| 550 | 419 | 30 | 0.2 | 118 | 23 | 20.7 |
| 600 | 434 | 30 | 0.2 | 118 | 23 | 45.8 |
| 650 | 449 | 30 | 0.2 | 118 | 23 | 59.9 |
| 700 | 470 | 30 | 0.2 | 118 | 23 | 70.2 |
| 750 | 487 | 30 | 0.2 | 119 | 23 | 68.2 |
| 550 | 526 | 15 | 0.1 | 112 | 23 | 61.6 |
| 600 | 454 | 15 | 0.1 | 114 | 23 | 69.7 |
| 650 | 480 | 15 | 0.1 | 114 | 23 | 70.1 |
| 700 | 497 | 15 | 0.1 | 114 | 23 | 70.3 |
| 700 | 1073 | 60 | <0.4 | 115 | 15 | 75.3 |
| 700 | 1099 | 60 | <0.4 | 113 | 5 | 74.3 |
| 550 | 1145 | 60 | <0.4 | 114 | 14 | 26.1 |
| 600 | 1245 | 100 | 0.6 | 115 | 21 | 31.9 |
| 600 | 1314 | 5 | 0.03 | 114 | 21 | 57.9 |

Example 18

Effect of Pressure on $HSiCl_3$ production. This example illustrates the effect of reaction pressure on the reactivity (conversion or yield) and selectivity of the method. To stainless steel reactor (inner dimensions: 0.75 inch (1.9 cm) inner diameter (id), 18 inches (46 cm) long) was loaded about 2.0 g of catalyst comprising 4.7% (w/w) Rh and 4.7% (w/w) Re both on carbon. The catalyst was activated with 200 sccm $H_2$ at 500° C. for 2 hours. Then the temperature of the reactor was increased to 600° C., and $MeSiCl_3$ was fed into the reactor via a syringe pump at a flow rate of 2.0 milliliters per hour (mL/h). Samples were collected in a dry-ice cooled condenser for 2 hours and analyzed by a gas chromatograph (GC). The results are shown below in Table 19.

TABLE 19

Effect of reaction pressure on $HSiCl_3$ production over 4.7 wt % Rh—Re/C catalyst at 600° C.

| Reaction Pressure (psig) | $MeSiCl_3$ Conversion (%) | Selectivity (wt %) $SiCl_4$ | $MeHSiCl_2$ | Total SiH | SiH Yield (wt %) |
|---|---|---|---|---|---|
| 100 | 66.7 | 44.2 | 7.2 | 48.6 | 32.4 |
| 200 | 93.6 | 53.8 | 0.7 | 45.5 | 42.6 |
| 300 | 97.3 | 49.1 | 0.4 | 50.5 | 49.1 |
| 400 | 97.0 | 47.6 | 0.5 | 51.9 | 50.4 |

Me = methyl; SiH = $HSiCl_2$ + $HSiCl_3$, Stainless steel reactor, $MeSiCl_3/H_2$ mol ratio = 0.071.

As seen from Table 19, higher reaction pressure favored higher $MeSiCl_3$ conversion and higher $HSiCl_3$ (TCS), $H_2SiCl_2$ (DCS) selectivities, higher DCS/TCS ratio and minimizes $MeHSiCl_2$. No significant SiH improvement was observed above 300 psig reaction pressure.

Example 19

Effect of $RSiCl_3/H_2$ mole ratio. This example illustrates the effect of $RSiCl_3/H_2$ mol ratio on the reactivity (conversion or yield) and selectivity of the method. To an INCONEL alloy reactor (inner dimensions: 0.375 inch (0.95 cm) (id), 18 inches (46 cm) long) was loaded about 2.0 g of catalyst comprising 1.0% (w/w) Rh and 1.0% (w/w) Re both on carbon. The catalyst was activated with 200 sccm $H_2$ at 500° C. for 2 hours. Then, the temperature of the reactor was increased to 600° C., and $MeSiCl_3$ was fed into the reactor via a syringe pump at a flow rate of from 2.0 mL/h to 175 mL/h. Hydrogen flow in the range 30 sccm to 700 sccm range was used to vary the $MeSiCl_3/H_2$ mol ratio in the range of from 0.010 to 10. Samples were taken from the reaction stream and injected into a GC for analysis using an online switching valve. The results are shown below in Table 20.

TABLE 20

Effect of $MeSiCl_3/H_2$ ratio on $HSiCl_3$ production over 1.0 wt % Rh—Re/C catalyst at 600° C.

| $H_2$ (sccm) | $MeSiCl_3$ flow | $MeSiCl_3/H_2$ Mol Ratio | Me conversion (wt %) | Selectivity (wt %) HCl | $MeHSiCl_2$ | $SiCl_4$ | SiH | SiH Yield (wt %) |
|---|---|---|---|---|---|---|---|---|
| 60 | 2.9 | 10 | 2.7 | 0.63 | 24.7 | 66.0 | 8.7 | 0.23 |
| 30 | 0.58 | 4.2 | 11.0 | 0.03 | 22.6 | 64.1 | 13.3 | 1.5 |
| 30 | 0.3 | 2.1 | 18.4 | 0.04 | 22.4 | 56.2 | 21.3 | 3.9 |
| 100 | 0.03 | 0.0699 | 58.8 | 0.80 | 9.2 | 45.6 | 44.4 | 26.1 |
| 700 | 0.03 | 0.010 | 85.2 | 2.6 | 4.6 | 27.2 | 65.7 | 56.0 |

Me = methyl; SiH = $H_2SiCl_2$ + $HSiCl_3$

As seen from Table 20, higher $H_2$ flow and lower $MeSiCl_3/H_2$ mol ratio favored higher $MeSiCl_3$ conversion and higher SiH yield and reduced $SiCl_4$ and $MeHSiCl_2$ selectivities.

Example 20

Effect of $H_2$ dilution. This example illustrates the effect of $H_2$ dilution with $N_2$ gas to reduce the $MeSiCl_3/H_2$ ratio on the reactivity (conversion or yield) and selectivity of the method. To an INCONEL ALLOY reactor (inner dimensions: 0.375 inch (0.95 cm) (id), 18 inches (46 cm) long) was loaded about 2.0 g of catalyst comprising 1.0% (w/w) Rh and 1.0% (w/w) Re both on carbon. The catalyst was activated with 200 sccm $H_2$ at 500° C. for 2 hours. Then, the temperature of the reactor was increased to 600° C., and $MeSiCl_3$ was fed into the reactor via a syringe pump at a flow rate of 2.0 mL/h $H_2$ gas flow in the range 200 sccm to 700 sccm range and $N_2$ gas flow in the range 0 sccm to 500 sccm range were used and the total gas flow was maintained at 700 sccm by diluting the $H_2$ with $N_2$ gas and running the reaction at reaction pressure of 150 psig. Samples were taken from the reaction stream and injected into a GC for analysis using an online switching valve and the results (average of 4 to 6 runs) are shown below in Table 21.

TABLE 21

Effect of $H_2$ dilution with $N_2$ on $HSiCl_3$ production over 1.0 wt % Rh—Re/C catalyst at 600° C. and 150 psig reaction pressure.

| $N_2$ (sccm) | $H_2$ (sccm) | $MeSiCl_3/H_2$ Mol Ratio | $MeSiCl_3$ conversion (wt %) | Selectivity (wt %) HCl | $MeHSiCl_2$ | $SiCl_4$ | SiH | SiH Yield (wt %) |
|---|---|---|---|---|---|---|---|---|
| 0 | 700 | 0.0100 | 92.1 | 0.3 | 2.2 | 32.0 | 65.5 | 60.4 |
| 200 | 500 | 0.0140 | 74.7 | 0.0 | 7.9 | 32.1 | 60.0 | 44.8 |
| 500 | 200 | 0.0351 | 49.0 | 0.0 | 15.4 | 37.2 | 47.4 | 23.2 |

Me = methyl; SiH = $H_2SiCl_2$ + $HSiCl_3$

As shown in Table 21, the results show that $H_2$ dilution by $N_2$ at similar reaction pressure reduced $MeSiCl_3$ conversion and $HSiCl_3$ (TCS), $H_2SiCl_2$ (DCS) selectivities, and increases $SiCl_4$ and $MeHSiCl_2$.

Example 21

Effect of reaction pressure on $H_2$ dilution reaction. This example illustrates the effect of pressure on $H_2$ dilution reaction. To an INCONEL alloy reactor (inner dimensions: 0.375 inch (0.95 cm) (id), 18 inches (46 cm) long) was loaded about 2.0 g of catalyst comprising 1.0% (w/w) Rh and 1.0% (w/w) Re both on carbon. The catalyst was activated with 200 sccm $H_2$ at 500° C. for 2 hours. Then, the temperature of the reactor was increased to 600° C., and $MeSiCl_3$ was fed into the reactor via a syringe pump at a flow rate of 2.0 mL/h. $H_2$ gas flow in the range 100 sccm to 700 sccm range and $N_2$ gas flow in the range 0 sccm to 600 sccm range were used and the total gas flow was maintained at 700 sccm by diluting the $H_2$ with $N_2$ gas and contacting ingredients at a reaction pressure of 150 psig. The reaction pressure was varied from 150 psig to 400 psig. Samples were taken from the reaction stream and injected into a GC for analysis using an online switching valve and the results (average of 4 to 6 runs) are shown below in Tables 22a and 22b.

TABLE 22a

Effect of pressure on $H_2$ dilution by $N_2$ over 1.0 wt % Rh—Re/C catalyst at 600° C.

| Entry | $N_2$ (sccm) | $H_2$ (sccm) | $MeSiCl_3/H_2$ Mol Ratio | $MeSiCl_3$ conversion (wt %) @ 150 psig* | 250 psig* | 400 psig* |
|---|---|---|---|---|---|---|
| 1 | 0 | 700 | 0.0100 | 92.1 | 97.2 | N/d |
| 2 | 200 | 500 | 0.014 | 74.7 | 89.4 | 89.7 |
| 3 | 500 | 200 | 0.0351 | 49.0 | 62.0 | 69.3 |
| 4 | 600 | 100 | 0.0699 | N/d | 37.8 | 46.5 |

TABLE 22b

| Entry | SiH Selectivity (wt %) @ 150 psig | 250 psig* | 400 psig* |
|---|---|---|---|
| 1 | 65.5 | 65.9 | N/d |
| 2 | 60.0 | 65.5 | 66.2 |

TABLE 22b-continued

| Entry | SiH Selectivity (wt %) @ 150 psig | 250 psig* | 400 psig* |
|---|---|---|---|
| 3 | 47.4 | 53.2 | 56.8 |
| 4 | N/d | 39.0 | 43.3 |

Me = methyl; SiH = $H_2SiCl_2$ + $HSiCl_3$;

*reaction pressure;

N/d means not determined.

In Tables 22a and 22b, the results show that the reduced $MeSiCl_3$ conversion and SiH ($HSiCl_3$+$H_2SiCl_2$) selectivity in the $H_2$ dilution reaction shown in Example 20 can be improved in Example 21 by increasing the reaction pressure (compare entry 1 with entries 2-4 in Table 22). For example, the $MeSiCl_3$ conversion and SiH selectivity at 700 sccm $H_2$ flow ($MeSiCl_3/H_2$ ratio=0.0100) may be achieved at a lower $H_2$ flow (500 sccm) and higher $MeSiCl_3/H_2$ ratio (0.0140) by increasing the reaction pressure to about 250 psig under $N_2$ dilution conditions. Similar reaction performance may be achieved at even lower $H_2$ flow and higher $MeSiCl_3/H_2$ ratio at higher reaction pressures (>400 psig).

Example 22

Effect of Reactor Material of Construction. This example illustrates the effect of reactor material of construction (MOC) on the reactivity (conversion or yield) and selectivity of the method. One of three different types of reactors (all having inner dimensions: 0.375 inch (0.95 cm) (id), 18 inches (46 cm) long) were used: reactor MOC (a) an INCONEL alloy reactor; (b) a quartz glass lined reactor; or (c) a stainless steel reactor. In separate experiments, to each reactor was loaded about 2.0 g of catalyst comprising 4.7% (w/w) Rh and 4.7% (w/w) Re both on carbon. The catalyst was activated with 200 sccm $H_2$ at 500° C. for 2 hours. Then, the temperature of the reactor was increased to 600° C., and $MeSiCl_3$ was fed into the reactor via a syringe pump at a flow rate of 2.0 mL/h Samples were taken from the reaction stream and injected into a GC for analysis using an online switching valve. The reaction was continued for 5 to 6 hours. This procedure was repeated using each of the different reactors at different $MeSiCl_3/H_2$ mol ratios and the results are shown below in Table 23.

TABLE 23

Comparison of $HSiCl_3$ production in different reactors over 4.7 wt % Rh—Re/C catalyst at 600° C.

| Reactor | MeSiCl3/H2 | MeSiCl3 | Selectivity (wt %) | | | | SiH Yield |
|---|---|---|---|---|---|---|---|
| MOC | Mol Ratio | Conv (wt %) | HCl | MeHSiCl2 | SiCl4 | Total SiH | (wt %) |
| INCONEL | 0.071 | 75.3 | 2.0 | 6.2 | 51.9 | 39.8 | 30.0 |
| Quartz glass | 0.071 | 70.0 | 1.18 | 7.6 | 44.5 | 46.7 | 32.7 |
| Stainless | 0.071 | 91.6 | 1.55 | 0.4 | 72.8 | 25.2 | 23.1 |
| INCONEL | 0.012 | 80.3 | 0.13 | 5.3 | 32.5 | 62.0 | 49.8 |
| Quartz glass | 0.012 | 78.3 | 0.59 | 5.3 | 32.8 | 61.3 | 48.0 |
| Stainless | 0.012 | 94.2 | 1.38 | 0.6 | 50.4 | 47.6 | 44.8 |

Me = methyl; SiH = $H_2SiCl_2$ + $HSiCl_3$

As shown in Table 23, the results suggest that a reactor with high iron content (Fe content≥50 wt %) disfavors higher SiH selectivity. Suitable reactor materials contain the low iron content.

Example 23

Rh on carbon. This example illustrates the effect of 4.7% Rh/C catalyst on the reactivity and selectivity of the reaction. To a stainless steel reactor (inner dimensions: 0.75 inch (1.9 cm) inner diameter (id), 18 inches (46 cm) long) was loaded about 2.0 g of catalyst comprising 4.7% (w/w) Rh on Carbon. The catalyst was activated with 100 sccm $H_2$ at 500° C. for 2 hours. Then temperature of the reactor was either kept at 500° C. or increased to 600° C., and $MeSiCl_3$ was fed into the reactor via a syringe pump at a flow rate of 2.0 mL/h. The reaction pressure was from 100 to 120 psig. Samples were collected in a dry-ice cooled condenser for 2 hour period and analyzed by a gas chromatograph and the results are shown in Table 24 below.

TABLE 24

$HSiCl_3$ production with Rh/C. (Me = methyl; SiH = $H_2SiCl_2$ + $HSiCl_3$)

| | | $MeSiCl_3$ | Selectivity (wt %) | | | | SiH |
|---|---|---|---|---|---|---|---|
| Temperature (° C.) | $H_2$ (sccm) | Conv (wt %) | HCl | $MeHSiCl_2$ | $SiCl_4$ | Total SiH | Yield (wt %) |
| 500 | 100 | 19.8 | 0.08 | 21.9 | 47.4 | 30.7 | 6.1 |
| 600 | 100 | 73.4 | 0.11 | 4.0 | 56.8 | 39.2 | 28.7 |

Example 24

Rh on carbon. In a flow reactor, about 0.3 g of 7.3 wt % Rh on carbon was loaded into a glass tube. Activation of the catalyst was performed with 10 sccm $H_2$ at 450° C. for ~15 hours. The temperature of the reactor was decreased to 300° C. and the reaction was started by passing $H_2$ through the $MeSiCl_3$ bubbler. Samples were taken from the reaction stream and injected into a GC for analysis using an online switching valve. The reaction was run while varying the following conditions: reaction temperature, flow rate of hydrogen, $MeSiCl_3$ bubbler temperature, and flow rate of $MeSiCl_3$. The catalyst activation and reaction were done without applying back pressure to the system. $HSiCl_3$ was produced at the conditions listed below in Table 25.

TABLE 25

Conversion of $MeSiCl_3$ to $HSiCl_3$ with Rh/C

| Temp. (° C.) | $H_2$ (sccm) | $MeSiCl_3$ (sccm) | Bubbler Temp (° C.) | HSiCl3 % Yield | MeHSiCl2 % Yield | SiCl4 % Yield | Me2SiCl2 % Yield |
|---|---|---|---|---|---|---|---|
| 300 | 10 | 0 | 25.2 | 0.0 | 0.0 | 3.9 | 0.1 |
| 400 | 10 | 0 | 25.7 | 0.6 | 0.7 | 1.6 | 0.4 |
| 500 | 10 | 0 | 26.3 | 1.1 | 2.5 | 2.8 | 0.6 |
| 600 | 10 | 0 | 26.8 | 2.4 | 6.4 | 5.1 | 0.7 |
| 700 | 10 | 0 | 27.4 | 10.1 | 5.5 | 18.6 | 1.0 |
| 700 | 10 | 0 | 15.6 | 11.0 | 6.5 | 16.6 | 0.8 |
| 700 | 10 | 0 | 0.7 | 14.5 | 6.9 | 19.5 | 0.6 |
| 700 | 10 | 0 | −14.7 | 22.9 | 5.5 | 28.2 | 0.4 |
| 700 | 10 | 3 | −12.9 | 6.9 | 0.0 | 91.7 | −1.5 |
| 700 | 20 | 0 | −14.7 | 20.5 | 6.6 | 23.1 | 0.4 |
| 800 | 10 | 0 | −15.5 | 25.1 | 0.0 | 73.3 | −1.5 |

Results in Table 25 show that Rh/C can selectively yield $HSiCl_3$ and yield relatively little or no $AlkylHSiCl_2$.

Example 25

Effect of reaction pressure on $H_2$ dilution reaction. This example replicated Ex. 21, Entry 1, except reaction pressure was 300 psig instead of 400 psig. $MeSiCl_3$ conversion was 99.5 wt % and SiH selectivity was 65.6 wt % (Si═$H_2SiCl_2$+$HSiCl_3$; N/d means not determined). The results show that the reduced $MeSiCl_3$ conversion and SiH ($HSiCl_3$+$H_2SiCl_2$) selectivity in the $H_2$ dilution reaction shown in Example 20 can be improved in Example 21 by increasing the reaction pressure.

That which is claimed is:

1. A method of making a trihalosilane, the method comprising:

contacting an organotrihalosilane according to the formula $RSiX_3$ (I), wherein R is $C_1$-$C_{10}$ hydrocarbyl and each X independently is halo, with hydrogen, wherein the mole ratio of the organotrihalosilane to hydrogen is from 0.009:1 to 1:2300, in the presence of a catalyst comprising a metal selected from (i) Re, (ii) a mixture comprising Re and at least one element selected from Pd, Ru, Mn, Cu, and Rh, (iii) [a mixture comprising Ir and at least one element selected from Pd and Rh, (iv)] Mn, ([v] *iv*) a mixture comprising Mn and Rh, ([vi] *v*) Ag[,] *and* ([vii] *vi*) Mg[, and (viii) Rh] at from 300 to 800° C. to form a trihalosilane of formula $HSiX_3$, wherein X is as defined above.

2. [The method of claim 1,] *A method of making a trihalosilane, the method comprising:*

*contacting an organotrihalosilane according to the formula $RSiX_3$ (I), wherein R is $C_1$-$C_{10}$ hydrocarbyl and each X independently is halo, with hydrogen,* wherein the mole ratio of the organotrihalosilane to hydrogen is from 1:3 to 1:2300, the metal is selected from (i) Re, (ii) the mixture comprising Re and at least one element selected from Pd, Ru, Mn, Cu, and Rh, (iii) [the mixture comprising Ir and at least one element selected from Pd and Rh, (iv)] Mn, ([v] *iv*) the mixture comprising Mn and Rh, ([vi] *v*) Ag, and ([vii] *vi*) Mg *at from 300 to 800° C. to form a trihalosilane.*

3. The method of claim 1, further comprising recovering the trihalosilane.

4. The method of claim 1, wherein R is $C_1$-$C_{10}$ alkyl and each X is chloro.

5. The method of claim 1, wherein R is methyl and each X is chloro.

6. The method of claim 1, wherein the contacting is at a reaction pressure of from greater than 0 to 2,900 kilopascals (gauge).

7. The method of claim 1, wherein the contacting is at from 500 to 700 degrees Celsius (° C.).

8. The method of claim 1, wherein the catalyst further comprises a support.

9. The method of claim 8 wherein the support is activated carbon.

10. The method of claim 9, wherein the catalyst comprises Re on the activated carbon; Re and Pd on the activated carbon; Rh and Re on the activated carbon; Ru and Re on the activated carbon; Mn and Re on the activated carbon; Re and Cu on the activated carbon; Ag on the activated carbon; Mn and Rh on the activated carbon; Mg on the activated carbon; Rh and Ir on the activated carbon; Ir and Pd on the activated carbon; or Rh on activated carbon.

11. The method of claim 1, wherein the catalyst comprises Rh on activated carbon and the contacting is at from 700 to 800 degrees Celsius (° C.).

12. The method of claim 1, wherein the catalyst comprises from 0.1 to 35% (w/w) of the metal or the mixture of metals.

13. The method of claim [1] *2*, wherein the mole ratio of the organotrihalosilane to the hydrogen is [from 1:3 to 1:2300, from 0.010:1 to 10, or] from 1:43 to 1:300.

14. The method of claim 1, wherein the organotrihalosilane and hydrogen have a residence time of 0.01 second to 10 minutes.

15. The method of claim 1, further comprising regenerating the catalyst after the contacting the hydrogen and the organotrihalosilane in the presence of the catalyst.

16. The method of claim 1, further comprising activating the catalyst prior to the contacting the hydrogen and the organotrihalosilane in the presence of the catalyst.

17. The method of claim 1, wherein contacting is performed in a reactor having a contact portion in contact with the organosilane and hydrogen, wherein the contact portion has an iron content of less than 20 weight percent.

18. The method of claim 1, further comprising making a dihalosilane in the contacting step, wherein the dihalosilane is of formula $H_2SiX_2$, wherein X is as defined for the trihalosilane.

19. The method of claim 18, wherein the contacting further comprises diluting hydrogen with a diluent gas and is performed at a pressure of from >1380 to 3450 kilopascals (gauge).

20. The method of claim 18, wherein the method is characterizable by a combined selectivity for making the trihalosilane and dihalosilane of at least 50 weight percent based on total weight of all silanes made in the contacting step.

* * * * *